(12) United States Patent
Lazo et al.

(10) Patent No.: US 10,198,215 B2
(45) Date of Patent: Feb. 5, 2019

(54) SYSTEM AND METHOD FOR MULTI-STREAM DATA WRITE

(71) Applicant: NGD SYSTEMS, INC., Irvine, CA (US)

(72) Inventors: Vincent Lazo, San Diego, CA (US); Joao Alcantara, Irvine, CA (US)

(73) Assignee: NGD Systems, Inc., Irvine, CA (US)

(*) Notice: Subject to any disclaimer, the term of this patent is extended or adjusted under 35 U.S.C. 154(b) by 194 days.

(21) Appl. No.: 15/419,527

(22) Filed: Jan. 30, 2017

(65) Prior Publication Data

US 2017/0371585 A1     Dec. 28, 2017

Related U.S. Application Data

(60) Provisional application No. 62/353,270, filed on Jun. 22, 2016.

(51) Int. Cl.
*G06F 3/06*     (2006.01)
*G06F 12/1009*  (2016.01)

(52) U.S. Cl.
CPC ............ *G06F 3/0656* (2013.01); *G06F 3/061* (2013.01); *G06F 3/0659* (2013.01); *G06F 3/0679* (2013.01); *G06F 12/1009* (2013.01); *G06F 2212/65* (2013.01)

(58) Field of Classification Search
CPC ...... G06F 3/0656; G06F 3/061; G06F 3/0659; G06F 3/0679; G06F 3/0611; G06F 3/0613; G06F 3/0638; G06F 3/064; G06F 3/0655; G06F 12/1009; G06F 12/0246; G06F 12/10; G06F 2212/65; G06F 2212/72; G06F 2212/7201; G06F 2212/7203; G06F 2212/7206

See application file for complete search history.

(56) References Cited

U.S. PATENT DOCUMENTS 9,092,362 B1 *   7/2015  Alcantara ........... G06F 12/0246
2015/0261456 A1* 9/2015  Alcantara ............. G06F 3/0679
                                                        711/103

(Continued)

OTHER PUBLICATIONS

Kang et al. "The Multi-streamed Solid-State Drive", 6th {USENIX} Workshop on Hot Topics in Storage and File Systems (HotStorage 14) 2014 (Year: 2014).*

*Primary Examiner* — Michael Krofcheck
(74) *Attorney, Agent, or Firm* — Lewis Roca Rothgerber Christie LLP

(57) ABSTRACT

A method of writing multi-stream host data to a storage device comprising a CPU, a multi-stream fast release buffer (FRB), and a non-volatile memory (NVM), includes: receiving a command to write the multi-stream host data to the NVM, the multi-stream host data being associated with a logical block number (LBN) and a new stream ID, recording a status of the active stream ID and retrieving a status of the new stream ID to determine a physical address in the NVM for storing one or more codewords (CWs) corresponding to the multi-stream host data, allocating space in a buffer of the FRB for storage of the multi-stream host data, organizing the multi-stream host data into the one or more CWs, and storing the one or more CWs into the allocated space in the buffer, transferring the one or more CWs from the buffer to the physical address in the NVM.

22 Claims, 8 Drawing Sheets

(56) References Cited

U.S. PATENT DOCUMENTS

| | | | |
|---|---|---|---|
| 2015/0261475 A1* | 9/2015 | Alcantara | G06F 3/0656 |
| | | | 710/56 |
| 2015/0261797 A1* | 9/2015 | Alcantara | G06F 17/30306 |
| | | | 707/813 |
| 2016/0266792 A1* | 9/2016 | Amaki | G06F 12/0246 |
| 2016/0283125 A1* | 9/2016 | Hashimoto | G06F 17/30123 |
| 2016/0291872 A1* | 10/2016 | Hashimoto | G06F 3/064 |
| 2016/0306552 A1* | 10/2016 | Liu | G06F 3/061 |
| 2017/0075832 A1* | 3/2017 | Bhimani | G06F 13/18 |
| 2017/0180478 A1* | 6/2017 | Hashimoto | H04L 67/1097 |
| 2017/0228188 A1* | 8/2017 | Hassani | G06F 3/0679 |
| 2018/0275889 A1* | 9/2018 | Matthew | G06F 3/0608 |

* cited by examiner

SYSTEM AND METHOD FOR MULTI-STREAM DATA WRITE

CROSS-REFERENCE TO RELATED APPLICATION(S)

This application claims priority to U.S. Application No. 62/353,270, filed on Jun. 22, 2016, the entire content of which is incorporated herein by reference.

This application is also related to U.S. Pat. No. 9,092,362, issued on Jul. 28, 2015, U.S. Pat. No. 9,354,822, issued on May 31, 2016, and U.S. Pat. No. 9,454,551, issued on Sep. 27, 2016, the entire contents of which are incorporated herein by reference.

FIELD

The following description relates to non-volatile storage systems, and more particularly, to a programmable data write management system, and to methods for operating the same in the non-volatile storage system.

BACKGROUND

Every day, several quintillion bytes of data may be created around the world. This data comes from everywhere: posts to social media sites, digital pictures and videos, purchase transaction records, bank transactions, sensors used to gather data and intelligence, like climate information, cell phone GPS signal, and many others. This type (e.g., kind) of data and its vast accumulation is often referred to as "big data." This vast amount of data eventually is stored and maintained in storage nodes, such as solid-state storage drives (SSDs), and the like, and these may reside on networks or on storage accessible via the Internet. This stored data may require processing, or be subject to operations, such as search, query, encryption/decryption, compression, decompression, and/or other processes.

Recently, SSDs have gained significant traction in enterprise datacenters and are increasingly replacing conventional hard disk drive (HDD) due to the SSDs' high performance, low power consumption, and continuously decreasing cost-per-gigabyte. One drawback to utilizing SSD is that in applications involving frequent writes to the SSD, valid data may be fragmented across the non-volatile memory (e.g., flash memory) of the SSD. Free space may be reclaimed by performing garbage collection, which copies user data to new storage blocks and erases invalid data blocks, thus freeing up storage space for writing new data. However, regular performance of garbage collection is an overhead that decreases both SSD read and write performance. Garbage collection further results in "write amplification," as a single host data write request may result in several internal SSD read and writes to the non-volatile memory. This includes, for example, first reading valid data from a storage block that is to be erased, then rewriting the read valid data to another storage block, followed by another write operation to store new host data in the non-volatile memory. As a result, write amplification reduces the effective lifetime of the SSD as each memory chip can undergo a finite number of writes before eventually failing.

The above information disclosed in this Background section is only for enhancement of understanding of the background of the invention and therefore it may contain information that does not form the prior art that is already known to a person of ordinary skill in the art.

SUMMARY

Aspects of embodiments of the present invention are directed toward a programmable data write management systems utilizing multi-stream data writes and methods for operating the same in a non-volatile solid-state drive.

Aspects of embodiments of the present invention are directed toward a multi-stream fast release buffer (FRB) for management of an internal data buffer of a solid-state storage drive (SSD) controller, for the conversion of host data to codeword(s) for storage in the non-volatile memory, and for performance of a multi-stream host write operation upon receiving a multi-stream write command from the controller processor.

According to some embodiments of the present invention there is provided a method of writing multi-stream host data to a storage device comprising a central processing unit (CPU), a self-organized, multi-stream fast release buffer (FRB), and a non-volatile memory, the storage device being in communication with a host, the method including: receiving, by the FRB, a command to write the multi-stream host data to the non-volatile memory from the CPU, the multi-stream host data being associated with a logical block number (LBN) and a new stream ID; determining, by the FRB, that the new stream ID does not match an active stream ID of a preceding write command; in response to the determining that the new stream ID does not match the active stream ID, recording, by the FRB, a status of the active stream ID and retrieving, by the FRB, a status of the new stream ID to determine a physical address in the non-volatile memory for storing one or more codewords (CWs) corresponding to the multi-stream host data; allocating space, by the FRB, in a buffer memory of the FRB for storage of the multi-stream host data; organizing, by the FRB, the multi-stream host data into the one or more CWs; storing, by the FRB, the one or more CWs into the allocated space in the buffer memory; transferring, by the FRB, the one or more CWs from the buffer memory to the physical address in the non-volatile memory; and sending, by the FRB, the LBN and the physical address to the CPU to update a logical-to-physical table.

In some embodiments, the recording of the status of the active stream ID includes: recording, by the FRB, a last used memory page of a block stripe of the non-volatile memory associated with the active stream ID, a number of available bytes of the last used memory page, and a code word offset and a data offset indicating an end position within the last utilized page of the block stripe associated with the active stream ID.

In some embodiments, the retrieving of the status information of the new stream ID includes: retrieving, by the FRB, a last used memory page of a block stripe of the non-volatile memory associated with the active stream ID, a number of available bytes of the last used memory page, and a code word offset and a data offset indicating an end position within a last utilized page of the block stripe associated with the new stream ID; and determining, by the FRB, the physical address in the block stripe based on the available bytes, the last used memory page of the block stripe, and the code word and data offsets.

In some embodiments, the method further includes recording status of the new stream ID after transferring the one or more CWs from the buffer memory to the physical address.

In some embodiments, each of the new and active stream IDs is one of a plurality of stream IDs recognized by the storage device, each of the plurality of stream IDs being associated with a block stripe of the non-volatile memory meeting characteristic requirements of the associated stream ID.

In some embodiments, at least one stream ID of the plurality of stream IDs is associated with two or more block stripes having the same characteristic.

In some embodiments, at least two stream IDs of the plurality of stream IDs are associated with a same block stripe of the non-volatile memory.

In some embodiments, the buffer memory includes a plurality of codeword (CW) spaces, each CW space of the plurality of CW spaces being associated with a CW index of a plurality of CW indexes, the CW indexes being stored in a CW pool of the FRB, and the allocating of the space in the buffer memory includes: determining, by the FRB, a count N of CW spaces sufficient to store the multi-stream host data in the buffer memory, N being an integer greater than 1; retrieving, by the FRB, N CW indexes from the CW pool on a first-in, first-out basis; removing, by the FRB, the N CW indexes from the CW pool; and associating, by the FRB, the N CW indexes with the multi-stream host data.

In some embodiments, the storing of the one or more CWs includes storing, by the FRB, the multi-stream host data in N CW spaces of the buffer memory that are associated with the retrieved CW indexes, and the method further includes de-allocating, by the FRB, the allocated space in the buffer memory by adding the removed N CW indexes to the CW pool.

In some embodiments, the organizing of the multi-stream host data into one or more CWs includes dividing, by the FRB, the multi-stream host data into one or more payload sections; and encoding, by the FRB, the one or more payload sections to generate the one or more CWs.

In some embodiments, the encoding of the one or more payload sections includes: instructing, by the FRB, an error correction code (ECC) engine to encode the one or more payload sections and to generate one or more parity sections; receiving, by the FRB, the one or more parity sections from the ECC engine, each parity section of the one or more parity sections corresponding to a payload section of the one or more payload sections; and combining, by the FRB, each payload section of the one or more payload sections with a corresponding one of the one or more parity sections to generate the one or more CWs.

In some embodiments, the transferring of the one or more CWs includes: determining, by the FRB, if a size of the CWs stored in the buffer memory is greater or equal to a size of a flash memory page; and in response to the determination, transferring, by the FRB, the one or more CWs from the buffer memory to a channel controller for storage in a physical address in the non-volatile memory.

In some embodiments, the transferring of the one or more CWs includes: receiving, by the FRB, a command to transfer the one or more CWs from the buffer memory to a channel controller for storage in a physical address in the non-volatile memory; and transferring, by the FRB, the one or more CWs from the buffer memory to the channel controller, wherein the command to transfer the one or more CWs is received when a size of the CWs stored in the buffer memory is greater or equal to a size of a flash memory page.

According to some embodiments of the present invention there is provided a storage device configured to receive and store multi-stream host data in response to a multi-stream host write request, the storage device including a central processing unit (CPU), a self-organized, multi-stream fast release buffer (FRB), and a non-volatile memory, the FRB including: a processor; and a memory having stored thereon instructions that, when executed by the processor, cause the processor to perform: receiving a command to write the multi-stream host data to the non-volatile memory from the CPU, the multi-stream host data being associated with a logical block number (LBN) and a new stream ID; determining that the new stream ID does not match an active stream ID of a preceding write command; in response to the determining that the new stream ID does not match the active stream ID, recording a status of the active stream ID and retrieving a status of the new stream ID to determine a physical address in the non-volatile memory for storing one or more codewords (CWs) corresponding to the multi-stream host data; allocating space in a buffer memory of the FRB for storage of the multi-stream host data; organizing the multi-stream host data into the one or more CWs; storing the one or more CWs into the allocated space in the buffer memory; transferring the one or more CWs from the buffer memory to the physical address in the non-volatile memory; and sending the LBN and the physical address to the CPU to update a logical-to-physical table.

In some embodiments, the recording of the status of the active stream ID includes: recording a last used memory page of a block stripe of the non-volatile memory associated with the active stream ID, a number of available bytes of the last used memory page, and a code word offset and a data offset indicating an end position within the last utilized page of the block stripe associated with the active stream ID.

In some embodiments, the retrieving of the status information of the new stream ID includes: retrieving a last used memory page of the block stripe of the non-volatile memory associated with the active stream ID, a number of available bytes of the last used memory page, and a code word offset and a data offset indicating an end position within a last utilized page of the block stripe associated with the new stream ID; and determining the physical address in the block stripe based on the available bytes, the last used memory page of the block stripe, and the code word and data offsets.

In some embodiments, the storage device further includes recording status of the new stream ID after transferring the one or more CWs from the buffer memory to the physical address.

In some embodiments, each of the new and active stream IDs is one of a plurality of stream IDs recognized by the storage device, each of the plurality of stream IDs being associated with a block stripe of the non-volatile memory meeting characteristic requirements of the associated stream ID.

In some embodiments, the buffer memory includes a plurality of codeword (CW) spaces, each CW space of the plurality of CW spaces being associated with a CW index of a plurality of CW indexes, the CW indexes being stored in a CW pool of the FRB, and the allocating of the space in the buffer memory includes: determining a count N of CW spaces sufficient to store the host data in the buffer memory, N being an integer greater than 1; retrieving N CW indexes from the CW pool on a first-in, first-out basis; removing the N CW indexes from the CW pool; and associating the N CW indexes with the host data.

In some embodiments, the organizing of the host data into one or more CWs includes: dividing the host data into one or more payload sections; and encoding the one or more payload sections to generate the one or more CWs.

In some embodiments, the transferring of the one or more CWs includes: determining if a size of the CWs stored in the buffer memory is greater or equal to a size of a flash memory page; and in response to the determination, transferring the one or more CWs from the buffer memory to a channel controller for storage in a physical address in the non-volatile memory.

According to some embodiments of the present invention, there is provided a storage device configured to receive and store multi-stream host data in response to a multi-stream host write command, the storage device including: a host controller coupled to the host and configured to receive the multi-stream host write command and multi-stream host data from the host, and to transfer the multi-stream host data to a self-organized, multi-stream fast release buffer (FRB); a channel controller coupled to a non-volatile memory of the storage device and configured to receive one or more codewords (CWs) from the FRB and to store the one or more CWs in the non-volatile memory; a central processing unit (CPU) coupled the host controller and the FRB, and configured to send to the FRB a command to write multi-stream host data to the non-volatile memory in response to the multi-stream host write command received by the host controller, and to update a logical-to-physical table; an error correction code (ECC) engine coupled to the FRB and configured to generate one or more parity sections corresponding to the one or more CWs; and the FRB including: a processor; and a memory having stored thereon instructions that, when executed by the processor, cause the processor to perform: receiving a command to write the multi-stream host data to the non-volatile memory from the CPU, the multi-stream host data being associated with a logical block number (LBN) and a new stream ID; determining that the new stream ID does not match an active stream ID of a preceding write command; in response to the determining that the new stream ID does not match the active stream ID, recording a status of the active stream ID and retrieving a status of the new stream ID to determine a physical address in the non-volatile memory for storing one or more codewords (CWs) corresponding to the multi-stream host data; allocating space in a buffer memory of the FRB for storage of the multi-stream host data; organizing the multi-stream host data into the one or more CWs; storing the one or more CWs into the allocated space in the buffer memory; transferring the one or more CWs from the buffer memory to the physical address in the non-volatile memory; and sending the LBN and the physical address to the CPU to update a logical-to-physical table.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be illustrative only.

DETAILED DESCRIPTION

Figure 1:
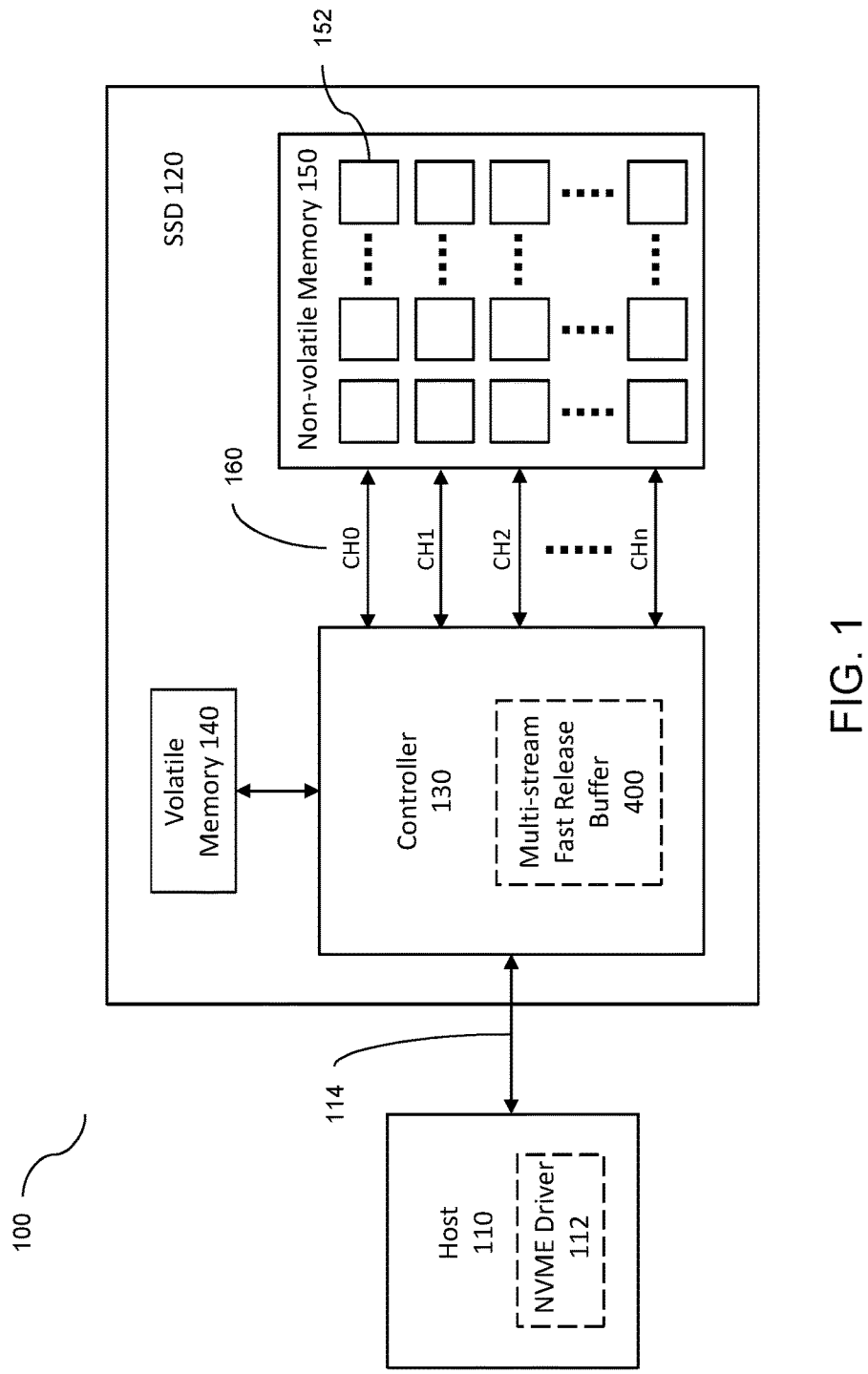
FIG. 1 is a block diagram of a system, which includes a host in communication with a storage node for performing host commands, according to some illustrative embodiments of the present invention.

The detailed description set forth below in connection with the appended drawings is intended as a description of illustrative embodiments of a system and method for performance of an efficient write, read, and/or garbage collection process in accordance with the present invention, and is not intended to represent the only forms in which the present invention may be implemented or utilized. The description sets forth the features of the present invention in connection with the illustrated embodiments. It is to be understood, however, that the same or equivalent functions and structures may be accomplished by different embodiments that are also intended to be encompassed within the spirit and scope of the present invention. As denoted elsewhere herein, like element numbers are intended to indicate like elements or features.

The present invention relates to a controller of a solid-state drive with improved multi-stream write capability, and a method of operating the same. A fast release buffer (FRB) in the controller manages the internal data buffer of the SSD and reduces (e.g., minimizes) the involvement of the controller processor in a read, write (e.g., multi-stream write), or garbage collection operation and frees up the controller processor to perform other operations, thus improving the overall performance of the SSD.

According to some embodiments, the FRB organizes host data (e.g., multi-stream data) into codewords during write operations, and receives the codewords from the non-volatile memory (e.g., Flash memory) during read operations and organizes the data in compliance with the host data format. In some embodiments, the translation from host to memory format (e.g., Flash format) is executed by hardware, consequently, reducing or minimizing involvement by the controller processor. Further, in some embodiments, the FRB compensates for possible slow write speeds of the memory devices of the non-volatile memory and improves (e.g., maximizes) the memory write performance by interleaving the host data to utilize many (e.g., all) memory devices in the non-volatile memory.

According to some embodiments, the controller and FRB of the SSD support multi-stream technology, such as non-volatile memory express (NVMe), which aids the controller (e.g., the FRB) in storing associated or similar lifetime data in the same storage block (e.g., same block stripe). In some embodiments, different streams are stored on different block stripes of the non-volatile memory of the SSD, which may have different endurances. Different streams may indicate different types of data (such as hot data, warm data, cold data, etc.), which may have differing storage requirements. In some embodiments, two or more stream types may be written to the same block stripe. Multi-stream data writing reduces (e.g., substantially reduces or eliminates) the overhead of garbage collection by improving (e.g., decreasing) fragmentation of data having the same or similar lifetime. As a result of the reduced write amplification, the controller further improves the read/write performance of the SSD and further extends the SSD device lifetime.

According to some embodiments, the controller (e.g., the FRB) is capable of efficiently switching between various stream types by storing and managing the status of each stream in an internal write stream table.

FIG. 1 is a block diagram of a system 100, which includes a host 110 (e.g., a server host) in communication with a storage node (e.g., SSD) 120 for performing host commands, according to some embodiments of the present invention.

In some embodiments, the host 110 and the SSD 120 may be implemented in a cloud-based computing environment. The host 110 and the SSD 120 may communicate using any suitable storage buses, such as peripheral component interconnect express (PCIe), with any suitable protocol that runs on it. In other embodiments, an SSD 120 may be connected to, and controlled by, a host central processing unit (CPU), which may be a server CPU or a CPU in an application not configured as a server.

As used herein, the phrase "in communication with" refers to direct communication with, or in indirect communication with, via one or more components named or unnamed herein. The host 110 and the SSD 120 can be in communication with each other via a wired or wireless connection. For example, in some embodiments, the SSD 120 may include a connector having pins (or a socket) to mate with a corresponding socket (or pins) on the host 110 to establish an electrical and physical connection. In another embodiment, the SSD 120 can include a wireless transceiver to place the host 110 and the SSD 120 in wireless communication with each other. The host 110 and the SSD 120 may be separately housed from each other, or contained in the same housing. The host 110 and the SSD 120 may include additional components, which are not shown in FIG. 1 to simplify the drawing.

The host 110 includes a processing device, such as a CPU, which performs operations on the data. The data may be written to the SSD 120 or may be read from the SSD 120, processed by the CPU, and the processed data may be sent to the source of a request. The host 110 operates based on logical addresses of the data, and may be unaware of the physical locations (e.g., also referred to as NAND flash physical addresses) of the data stored on the SSD 120. The host 110 may include a non-volatile memory express (e.g., NVMe) driver 112, which allows the host 110 to communicate with the SSD 120 via the NVMe I/O interface and enables the host hardware and software to utilize levels of parallelism found in the SSD 120. In some examples, the host 110 and the SSD 120 may communicate via a link (e.g., a PCIe bus) 114.

According to some embodiments of the present invention, the SSD 120 may include a controller 130, a volatile memory (e.g., dynamic random access memory (DRAM)) 140, and a non-volatile memory (e.g., flash memory) 150 including one or more memory devices (e.g., flash dies or NAND flash chips) 152. The controller 130 facilitates the transfer of data to and from the SSD 120 and includes a flash translation layer (FTL), which may be a software layer acting as a translation layer between the sector-based file system of the host 110 and the flash memory devices 152 of the SSD 120. The FTL, which may be implemented in software and/or hardware, provides the operating system and the file system on the host side access to the flash memory devices 152 and ensuring that they behave (or appear) as one block storage device. In so doing, the FTL hides the complexity of flash by providing a logical block interface to the flash device by mapping the host's logical addresses to the flash memory's (e.g., NAND flash memory's) physical addresses in the logical to physical (LtoP) table. The LtoP table may be stored in the volatile memory 140 and the data to and/or from the host 110 may be stored in the non-volatile memory 150. In an example, the LtoP table may also be stored in the non-volatile memory 150.

The SSD 120 (e.g., the controller 130) may further include a channel controller having one or more bi-directional channels (e.g., flash channels) acting as conduits for transferring data to and from the non-volatile memory 150. Each channel 160 may correspond to (e.g., be coupled to) one or more memory dies 152. Having a number of channels 160 enables parallel processing of the write and read commands by the controller 130 as, for example, at any given time, one channel 160 may be writing to a set of memory dies 152, while another channel 160 may be reading from a different set of memory dies 152.

The controller 130 is configured to be capable of queueing operations in order to increase (e.g., optimize) performance of the data transfers to and from the host 110. Further, the controller 130 is configured to manage variable command queue depth from the host 110. As such, the host 110 may send several command requests to the SSD 120, and the controller 130 may pre-process the commands and send more than one request at a time to the non-volatile memory 150, thus, improving (e.g., increasing) the overall performance of the SSD 120. According to some embodiments, the controller 130 includes a fast release buffer (FRB) 400 for operating an internal data buffer of the controller 130 and for streamlining the write, read, and garbage collection processes of the controller 130, thus improving the performance of the SSD 120.

Figure 2:
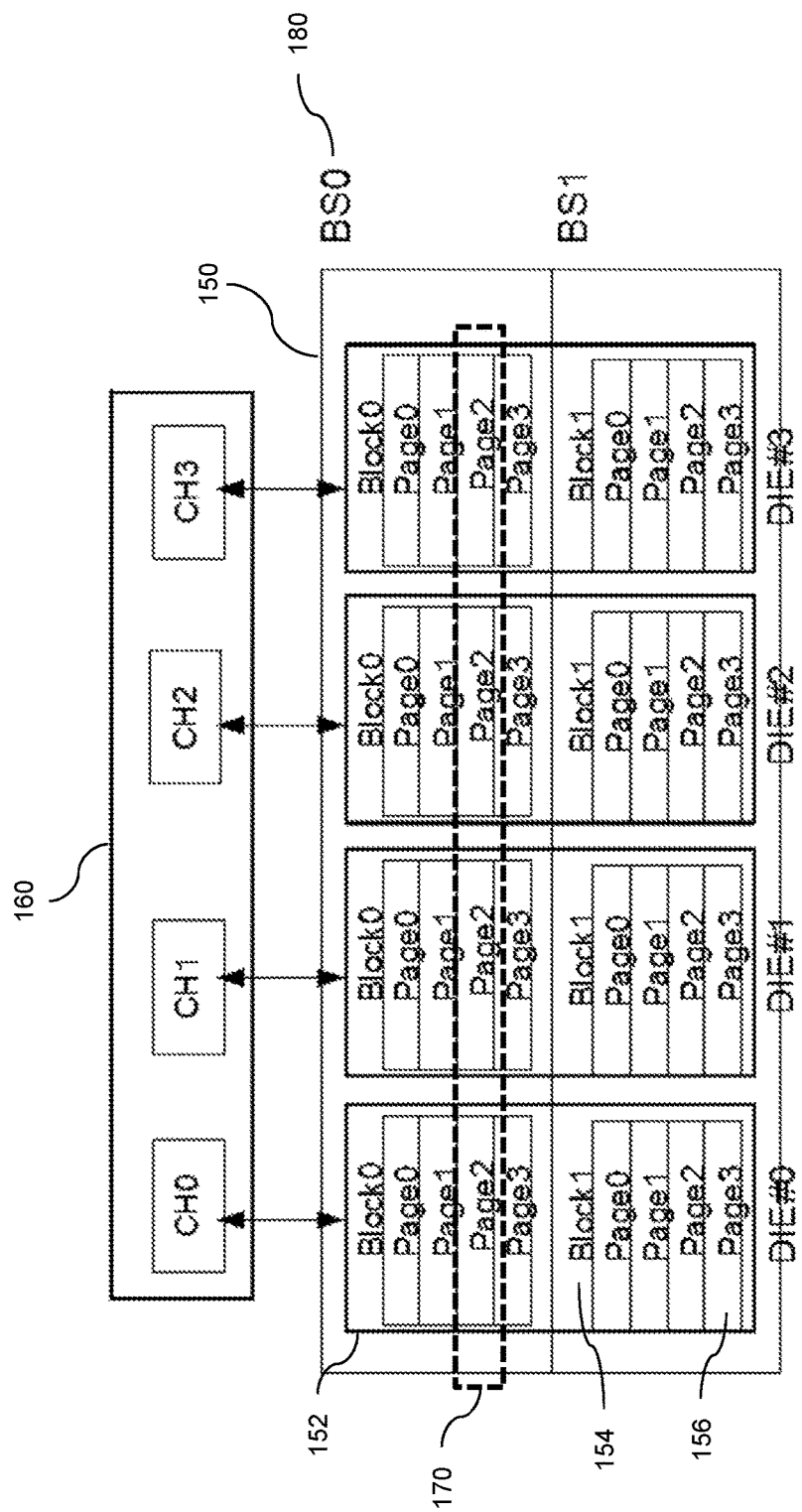
FIG. 2 is a representation of a related art non-volatile memory including a number of memory dies.

FIG. 2 is a representation of a related art non-volatile memory 150 including a number of memory dies (e.g., flash devices or flash dies) 152. A memory die 152 may be partitioned into blocks (e.g., flash blocks) 154 (such as block0 and block1 of die0), where each block 154 includes a number of pages (e.g., flash pages) 156 (such as pages 0-4 of block1 of die0) of a fixed size (e.g., 512 Bytes). The page size may represent the smallest size of data that may be written to the memory die 152. Erasure of data on the memory die 152 may be performed in units of one block 154. A group of pages 156 having a same index (e.g., page0 of dies 1-P, where P is a positive integer greater than 1) may be referred to as a data stripe or page stripe 170. Similarly, a group of blocks 154 having a same index (e.g., block0 of dies 1-P) may be referred to as a block stripe 180.

For ease of illustration, the example of FIG. 2 illustrates a SSD 120 having four channels with one die per channel. However, as understood by a person of ordinary skill in the art, a greater number of channels and dies per channel are utilized in a related art SSD 120.

According to some embodiments of the present invention, to improve (e.g., optimize) performance during write operations to the non-volatile memory 150, a controller 130 may organize the incoming data from a host 110 into a sequential stream of data distributed across all memory devices 152, which may be referred to as host write stream. In some embodiments, the controller 130 may retrieve sequential and/or non-sequential host sectors from the host 110 and distribute them onto the non-volatile memory 150 in a sequentially organized manner. This sequential programming may be described as starting from an initial page stripe 170, programming the consecutive pages 156 within the initial page stripe 170, moving to a next page stripe 170 when all pages 156 of the initial page stripe 170 have been programmed to, sequentially programming the pages 156 within the next page stripe 170, and so forth. For instance, in the example of FIG. 3, the controller 130 may write the host data to the memory dies 152 in the following order: PS0 of die0, PS0 of dies 1, PS0 of die2, and PS0 of die3, PS0 of die1, PS1 of die1, and so forth.

According to some embodiments, the host 110 may open different streams in the SSD 120 and transmit data write requests to the different streams according to the data's expected lifetime. The controller 130 then ensures that the data in each stream are organized in a physically related storage space (e.g., a block 154 or an "erase unit") that is separate from data of other streams. The organization of data having different expected lifetimes into separate and distinct blocks/erase units may reduce fragmentation of valid data in the non-volatile memory 150, thus reducing garbage collection overhead and enhancing the effective throughput and lifetime of the SSD 120. For example, cold data (e.g., data that is infrequently accessed) may be stored in higher endurance memory devices 152 as compared to hot data (e.g., data that is frequently accessed). In some examples, different streams (i.e., different stream IDs) may be associated with different ones or groups of virtual machines, databases, and/or the like. Thus, when, for example, a user terminates a virtual machine (which, e.g., may be created on the cloud), only the erase units associate with the virtual machine's stream ID need be erased, without the need to utilize garbage collection. In further examples, stream IDs may be utilized to group data associated with specific data processing (e.g., INSITU or "on site" data processing) tasks. In such scenarios, a first stream ID may be associated with (e.g., assigned to) a first set of data on which, for example, a search is being performed, and a second stream ID may be assigned to a second set of data on which, for example, a data classification algorithm for a machine learning task is being performed. At the end of any of the data processing operations, if the data associated with any of the data processing tasks is to be discarded, no garbage collection is necessary, and only some erase operations may be performed.

Figure 3:
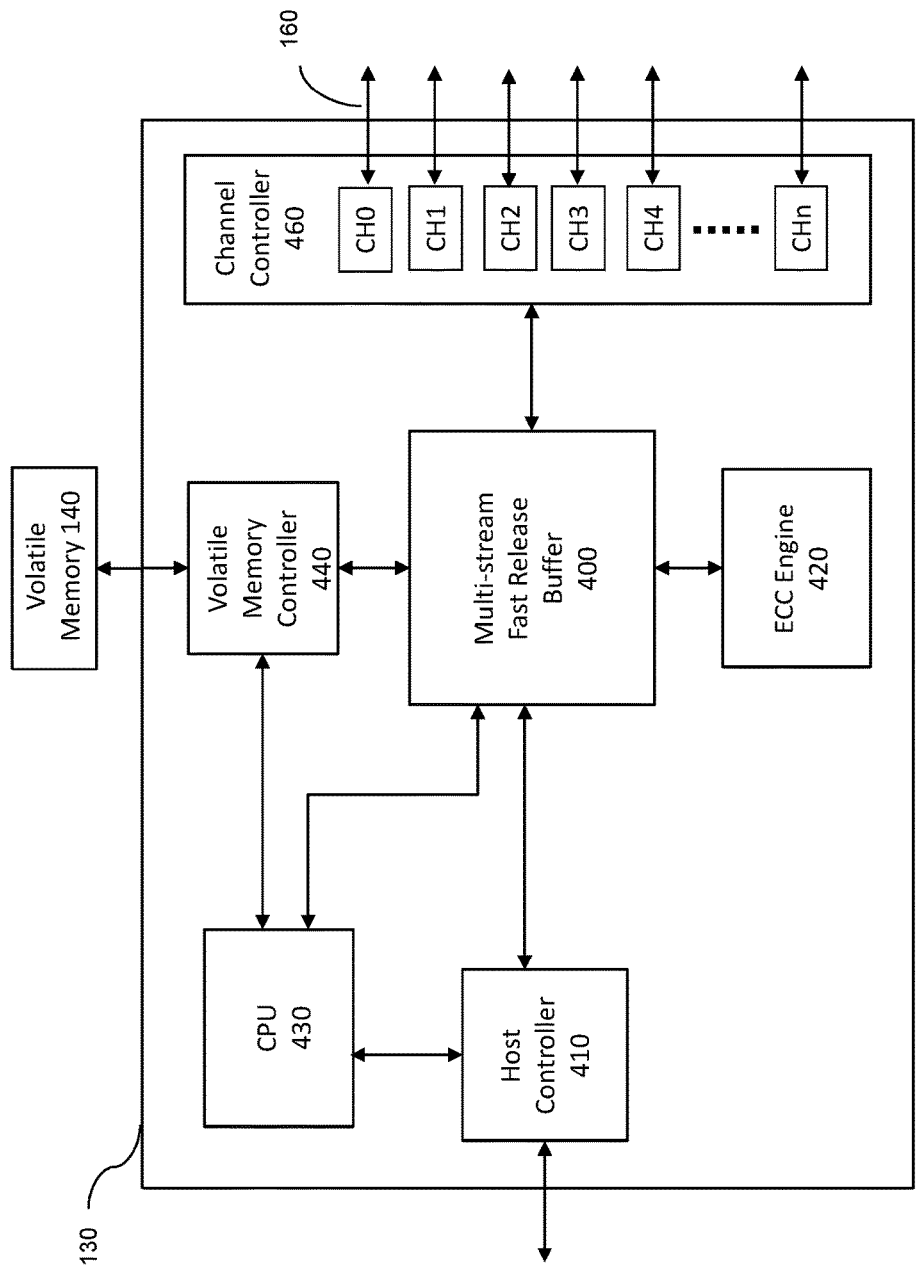
FIG. 3 is a block diagram of a SSD controller utilizing a multi-stream fast release buffer (FRB), according to some illustrative embodiments of the present invention.

FIG. 3 is a block diagram of a SSD controller 130 utilizing a multi-stream fast release buffer (FRB) 400, according to some embodiments of the present invention.

In some embodiments, the SSD controller 130 includes a multi-stream fast release buffer (FRB) 400, a host controller 410, an ECC engine 420, a controller processor (e.g., a CPU) 430, a volatile memory controller 440, and a channel controller 460. According to some embodiments, the multi-stream FRB 400 is distinct and separate from (e.g., physically and functionally separate from) the controller processor 430 and is not integrated with the controller processor 430.

According to some embodiments of the present invention, the multi-stream FRB 400 is a central block responsible for the communication between the host 110 and the non-volatile memory 150. The FRB 400 performs a number of tasks related to the execution of read, write, and garbage collection (GC) operations. These tasks may include, for example, managing an internal data buffer allocation and release, organizing host data to match the flash data format (e.g., logical block number (LBN) to codeword (CW) translation), defining the physical location of the LBN's in the non-volatile memory 150, communicating with the ECC engine 420 to encode and decode CWs (e.g., data streams), managing host read, host write, and read-modify-write (RMW) executions command executions, and performing garbage collection on the non-volatile memory 150 (e.g., under the management of the controller processor 430), and/or managing the write/read tags. For example, the FRB 400 may send write page commands to channel controller 460, assembling a logical block during a read operation, and produce the host write stream and garbage collection stream. According to some examples, the FRB 400 also manages and keeps track of the writing of multi-stream data provided by the host 110 to the non-volatile memory 150. In some respects, the FRB 400 acts as an intermediary data buffer between the host 110 and the non-volatile memory 150 that self-organizes the data to and from the host and the non-volatile memory 150.

According to some embodiments of the present invention, the host controller 410 defines the destination (e.g., the FRB 400 or the volatile memory 140) of the logical blocks (LBs) of data being transferred to and from the host 110. Further, the host controller 410 receives host commands from the host 110 and forwards them to the controller processor 430, which decodes the commands and performs the appropriate action(s) to handle the commands. In some embodiments, the host controller 410 assigns a tag to a command upon receiving the command from the host 110. For example, during a write operation, the host controller 410 notifies the controller processor 430 of the incoming command and adds a command tag to it. Similarly, during a read operation, the host controller 410 notifies the controller processor 430 of the incoming command and adds a command tag to it. In some embodiments, the controller processor 430 may tag the host commands as read or write commands in lieu of the host controller 410.

According to some embodiments, the host controller 410 or the controller processor 430 decodes a write command from the host 110 to identify a stream type, as indicated by a stream ID, associated with the write command, and adds (e.g., appends) the stream ID to the write tag. The stream ID allows the FRB 400 to write the associated host data to the appropriate location within the non-volatile memory, which corresponds with the stream ID. In some embodiments, the write tag may not include an indication of the associated stream ID. For example, a stream ID of zero may be reserved as a default, non-multistream indicator, and any non-zero stream ID may indicate an active multistream. However, embodiments of the present invention are not limited thereto, and in some embodiments, the write tag may include one or more bits indicated the associated stream ID.

The host controller 410 initiates the transfer of data from the host 110 by transferring the respective logical blocks to the FRB 400. Once the FRB 400 notifies the host controller 410, either directly or via the controller processor 430, that the corresponding LBNs to the logical blocks are available, the host controller 410 requests the corresponding LBNs from the host 110.

According to some embodiments, the ECC engine 420 receives codeword (CW) encoding requests from the FRB 400 (as, for example, may occur during a write operation to the non-volatile memory 150) and generates code bits (e.g., parity bits) accordingly. Similarly, the ECC engine 420 may receive decode requests from the FRB 400 (as, for example, may occur during the read process from the non-volatile memory 150). During the decoding process, the ECC engine 420 may also correct bit errors in the data retrieved from the non-volatile memory 150 based on the code bits in the CW. In some embodiments, the ECC engine 420 also generates die-failure code bits corresponding to the lifetime of the memory device being written to.

The volatile memory controller 440 serves as an interface between the volatile memory and the controller processor 430 and the FRB 400.

In some embodiments, the channel controller 460 receives commands from the controller processor 430 and/or the FRB 400 to read from or write to the non-volatile memory 150. The channel controller 460 also manages the non-volatile memory 150 interface protocol (e.g., flash interface protocol). Once a write operation is completed by the channel controller 460, it sends a command complete signal to the FRB 400 and the controller processor 430, which signals the FRB 400 to release the internally allocated CW space that was associated with the write command, and signals the controller processor 430 to update the logical to physical (LtoP) table accordingly.

Figure 4A:
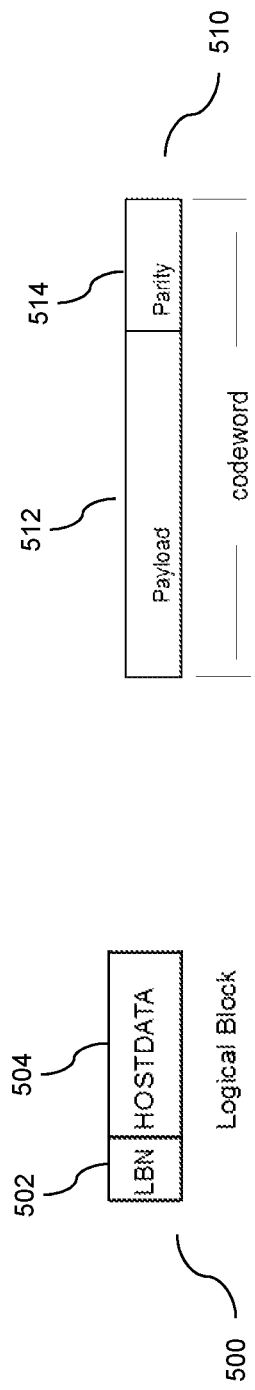
FIG. 4A is a representation of the organization of host data as a logical block and a codeword, according to some illustrative embodiments of the present invention.
Figure 4B:
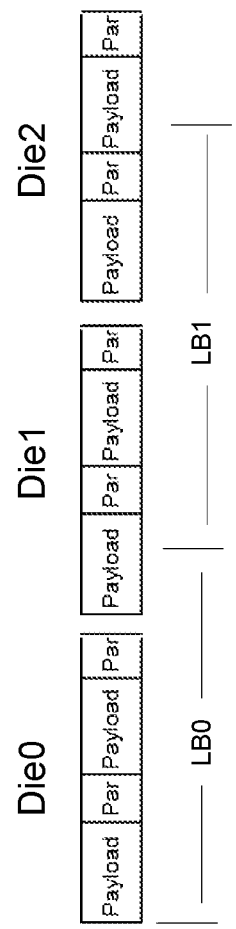
FIG. 4B is a representation of the relative sizes of the codewords and memory pages of the non-volatile memory, according to some illustrative embodiments of the present invention.

FIG. 4A is a representation of the organization of host data as a logical block (LB) and a codeword, according to some illustrative embodiments of the present invention. FIG. 4B is a representation of the relative sizes of the codewords and memory pages of the non-volatile memory 150, according to some embodiments of the present invention.

According to some embodiments of the present invention, the controller 130 packages a host sector of data (hereinafter referred to as a host sector) 504 into a logical block (LB) 500, which includes a logical block number (LBN) 502 and host data 504. In an example, the host sector 504 may be 4 KB in size and the LBN 502 may be 4 bytes in size (thus making the logical block 500 about 4 KB (i.e., 4K+4 Bytes) in size). In some embodiments, the logical block 500 may be stored in the non-volatile memory 150 in the form of one or more codewords (CWs) 510, with each codeword (CW) 510 including a payload section 512 and a parity section (e.g., error correction codes or coded sections) 514. The payload section 512 may include at least part of a logical block 500, and the parity section 514 may be parity bits generated by the ECC engine 420 and corresponding with the bit values of the payload section 512. The parity bits may allow the controller 130 (e.g., via the ECC engine 420) to detect and/or correct errors in data retrieved from the non-volatile memory 150. The FRB 400 may communicate with the ECC engine 420 to encode/decode data to/from the non-volatile memory 150.

The size ratio of the payload section 512 to the codeword 510 may be referred to as a code rate, which may be set (e.g., determined) by a configuration register programmed by the controller processor 430.

The size of each codeword 510 may be set to a memory page size divided by an integer that is a power of two. Thus, the size of the logical block 500 may not be an integer multiple of the size of the CW. For example, a logical block 500 may occupy more than two CWs 510, as illustrated in FIG. 4B.

Figure 5:
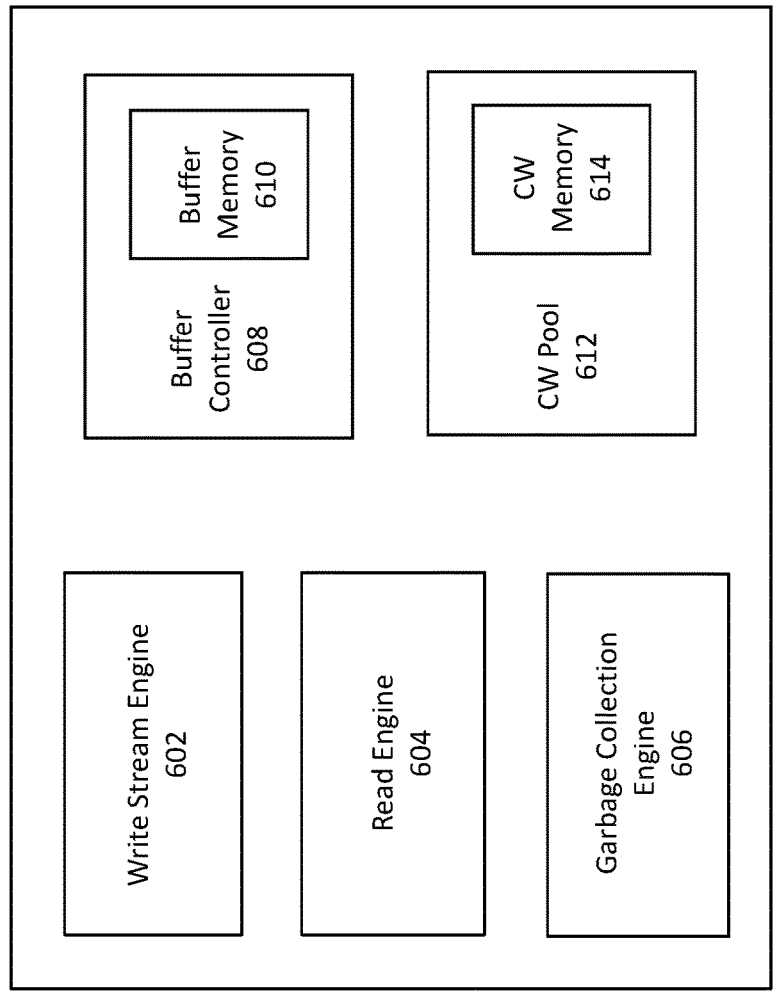
FIG. 5 is a block diagram of the FRB, according to some illustrative embodiments of the present invention.

FIG. 5 is a block diagram of a fast release buffer (FRB) 400, according to some embodiments of the present invention. In some embodiments, the FRB 400 includes a write stream engine (e.g., a multi-stream write engine) 602, a read engine 604, a garbage collection (GC) engine 606, a buffer controller 608, and a codeword (CW) pool 612. The buffer controller 608 includes a buffer memory 610, which serves as the main data buffer in the controller 130. The CW pool 612 includes a codeword memory 614, which stores a list of available CWs (e.g., stores a list of indexes of available CWs) in the buffer memory 610.

In some embodiments, the buffer memory 610 is divided into regions that are each the size of a codeword. For example, a 2 MB buffer memory 610 may be divided into 1024 2 KB codewords, where codeword 0 indicates the first 2 KB of the buffer memory 610. The division of the buffer memory 610 may be determined by a configuration register programmed by the controller processor 430. All transfer of data between the FRB 400 and the channel controller 460 may occur at a CW granularity and any reference to read and/or write data from the buffer memory 610 may be made through tags.

In some embodiments, the codeword size is set to the page size divided by a number that is a power of two (e.g., 2, 4, 8, etc.). For example, when a page size is 9296 Bytes (8 KB+1104 Bytes), a codeword size may be 9296 Bytes divided by 4, that is, 2324 Bytes. If a smaller codeword is desired or preferred, the page size may be divided by 8 to obtain a CW of 1162 Bytes. However, the FRB 400 may support any CW size that is defined by the controller processor 430. In some embodiments, the CW size utilized by the FRB 400 is constant throughout the lifetime of the SSD 120.

According to some embodiments, the FRB 400 acts as a data buffer management block and organizes the host data into CWs and manages the space availability in the buffer memory 610. In some embodiments, the CW pool 612 stores the indexes of all available CWs in the CW memory 614 and maintains the order in which the CWs become available to be written to. The CW memory 614 of the CW pool 612 is a first-in, first-out (FIFO) memory to which all CW indexes may be added during system initialization (e.g., at a first power-on at the time of manufacturing). In the example of the 2 MB buffer memory divided into 1024 2-KB codewords, the first to last elements of the FIFO memory will initially contain the numbers 0 through 1023, as all CW indexes are available at startup. The presence of an index in the CW memory 614 indicates that the respective area in the buffer memory 610 is available to be utilized by any requesting block.

In some embodiments, the controller processor 430 is the only other block in the controller 130 that has information about the location of the data stored in the buffer memory 610.

According to some embodiments of the present invention, during a host write operation, the FRB 400 receives from the controller processor 430 an LBN write request and a write command tag (write tag or WrTag). The FRB 400 adds the LBN(s) to the current host data write stream, which may be located in the write stream engine 602, and allocates sufficient CW space in the buffer memory 610. The FRB 400 allocates the CW space by determining the number of CWs needed to store the host data, requesting the same number of CWs from the CW pool 612 and associating the CWs with the LBN(s) of the host data. The CW pool 612 releases the CWs on a FIFO basis and removes them from the CW memory 614 (e.g., deletes the respective CW indexes from the CW memory 614). The FRB 400 stores the host data corresponding with the LBN(s) as codewords in the allocated CW spaces, tags the CW indexes belonging to the same memory page in the non-volatile memory 150, and maintains the link between the tags and the CWs. In some embodiments, the FRB 400 sends a request to the ECC engine 420 to encode the CWs. In some embodiments, the FRB 400 also sends the physical location that the CWs will occupy in the non-volatile memory 150, so that the ECC engine 420 may generate die-specific failure parity protection to take into account the effect of memory wear on the die(s) being written to.

In some embodiments, when the host data occupies more than one logical block, the FRB 400 may be aware of the sequence of the LBNs and may organize the incoming host data in a sequential manner producing a write stream.

Once the FRB 400 has accumulated sufficient CWs in the buffer memory 610 to fill a page in the non-volatile memory 150, the FRB 400 or the controller processor 430 sends the write command to the channel controller 460 indicating the write tag and the physical location of the flash page. The location may be determined based on the stream ID of a multi-stream data. For example, host data having different stream types or stream IDs may be stored onto different block stripes of the non-volatile memory 150 depending on the requisite characteristics of each stream type or stream ID. In some embodiments, each stream ID may be associated with (i.e., written to) one or more block stripes that meet the requisite characteristics (e.g., having sufficient lifetime/endurance characteristics) of the stream ID. In some embodiments, one or more stream types (stream IDs) may be written to the same block stripe.

The channel controller 460 may utilize the write tag to request data from the FRB 400. The FRB 400 then links the write tag to the list of CWs to be written and sends the correct data (i.e., the CWs) to the channel controller 460. In this manner, the channel controller 460 need not be aware of which CWs to request from the FRB 400.

According to some examples, each write tag correlates to a particular page within the non-volatile memory 150. For example, Wrtag0 may correspond to channel 0, block 0, page 0. Each write tag is also reusable so that when an operation related to the write tag is completed the write tag is released and can be correlated to a different physical address within the non-volatile memory 150. For example, after being released, the WrTag0 may then be correlated to (e.g., set to represent) channel 1, block 5, page 7, or any other physical location. Each write tag from the pool of write tags may be managed (e.g., issued and released) by the controller processor 430. The controller processor 430 may maintain a table within the volatile memory 140, which indicates the current associations of each of the write tags with the physical locations within the non-volatile memory 150.

Once the transfer of the CWs to the channel controller 460 is complete, the FRB 400 may release the CW spaces in the buffer memory 610 to be utilized again by a future operation. After the page program is complete (i.e., the CWs are stored at physical locations at the non-volatile memory 150), the channel controller 460 may indicate to the FRB 400 that the command corresponding to the write tag is complete, and the FRB 400 may forward the initial physical location of the LBN(s) in the non-volatile memory 150 and the write tag associated with it to the controller processor 430. The controller processor 430 may utilize this information to update the LtoP table in the volatile memory 140. The FRB 400 may also return the utilized CW indexes to the CW pool 612 to be reused at a later point.

According to some embodiments of the present invention, during a host read operation, the FRB 400 utilizes the read engine 604 that manages the transfer of data from the non-volatile memory 150 to the host 110. The process flow of the read engine 604 may be in some ways the opposite of that of the write stream engine 602. A more detailed discussion of the host data read process performed by the read engine 604 may be found in the related U.S. Pat. No. 9,354,822, issued on May 31, 2016.

According to some embodiments of the present invention, the FRB 400 utilizes write streams during a write operation. Further, in order to reduce (e.g., minimize) processing load (e.g., write overhead) on the controller processor 430, the FRB 400 may manage the host write stream process. When the host 110 sends a write command to the controller 130, the controller processor 430 parses the command to identify the stream type (or the stream ID) associated with the write command, and determines which block stripe(s) of the non-volatile memory to store the host data in. In some embodiments, one or more of the block stripes of the non-volatile memory 150 have endurances different from those of other block stripes. The differences in endurance may make one block stripe more appropriate for storing a particular type of data (e.g., cold data, warm data, or hot data) than other block stripes. According to some embodiments, each stream type is stored on a separate block, block stripe, or a group of block stripes of the non-volatile memory 150. For example, block stripe BS0 may store stream ID0, BS1 may store stream ID5, BS2 may store stream ID1, etc. However, embodiments of the present invention are not limited thereto, and, for example, more than one stream IDs may be stored on the same block stripe of the non-volatile memory 150.

After selecting the block stripe corresponding to the stream ID of the host write command, the controller processor 430 provides the block stripe number to the FRB 400 to be utilized by the write stream engine 602. The controller processor 430 may also provide information on invalid memory blocks (e.g., blocks that should not be written to) and on how many memory pages fit in a block stripe. The incoming data from the host 110 may be transferred to the FRB 400 (e.g., transferred to the buffer memory 610) as described above with reference to FIG. 5. The write stream engine 602 of the FRB 400 then creates a link between the LBNs corresponding to the incoming host data (e.g., host LBNs) and the data location in the buffer memory 610. The write stream engine 602 assigns the host LBNs to a physical location in the non-volatile memory 150 (e.g., a particular page stripe in the selected block stripe corresponding to the stream ID) and keeps track of the relationship between the host LBNs and the blocks in the non-volatile memory 150. Once enough data has accumulated in the buffer memory 610 to occupy a page in the selected block stripe of the non-volatile memory 150, the write stream engine 602 sends a command to the channel controller 460 to program (e.g., to store or write to) the first available page (which may or may not be the first page) of the selected block stripe (e.g., page0 of die0 of said block stripe). In some embodiments, the command includes a tag (e.g., WrTag) that is utilized by the channel controller 460 to request the data (e.g., the host data stored in the buffer memory 610) to be written to the non-volatile memory 150 from the FRB 400. The write stream engine 602 may also send the list of LBNs associated with the tag to the controller processor 430.

The tag may simplify the communication between the controller processor 430, FRB 400, and channel controller 460, as there may be no need to send the locations of the data in the buffer memory 610 to any block outside of the FRB 400. Thus, by using tags, no block other than the FRB 400 may be aware of the location of data in the buffer memory 610.

In some embodiments, once the channel controller 460 completes the write command (e.g., stores the data to the non-volatile memory 150), the channel controller 460 sends a write complete status signal to the controller processor 430 and the write stream engine 602. The status signal may include the tag corresponding to the write command. Using the tag, the controller processor 430 may update the LtoP table, which is stored in the volatile memory 140, and the write stream engine 602 may release the space allocated to the transferred host data (e.g., add the CW indexes of the released CW spaces to the CW memory 614) for future utilization.

According to some embodiments of the present invention, the write stream engine 602 may communicate with the ECC engine 420 to encode CWs and select a different level of ECC protection for each memory page in the stream, depending on the quality and/or state of memory pages (or memory blocks) in the non-volatile memory 150. For example, the write stream engine 602 may allocate a higher number of parity bits (and, e.g., a lower number of payload bits) to a CW that will be stored in a memory block that is worn out (e.g., has been written to a large number of times). Thus, the FRB 400 is capable of handling the variations of quality between memory blocks and between pages within a same memory block. In some embodiments, the FRB 400 may vary the size of (e.g., the number of bits allocated to) the payload and/or the ECC depending on a requisite protection level, which may be determined based on the type (e.g., kind) of data being stored in the non-volatile memory 150. For example, in some embodiments in which data integrity is of critical concern, the FRB 400 may allocate a higher number of parity bits to each CW in order to achieve a greater level of data protection.

According to some embodiments, the write stream engine 602 may skip (e.g., not write to) dies, memory blocks, and/or memory pages that have been marked by the controller processor 430 as invalid and/or inactive. The controller processor 430 may notify the FRB 400 of the invalid/inactive region(s) when it allocates the memory block to be written to.

According to some embodiments, the controller processor 430 programs the FRB 400 with a number of parameters including, for example, CW size, CW code rate, the number of pages in a page stripe. The controller processor 430 may program these parameters at any point (e.g., for every new page stripe during a write operation).

According to some embodiments of the present invention, the FRB 400 may perform garbage collection tasks in tandem with or in lieu of the controller processor 430. By performing garbage collection (e.g., reclaiming/de-allocating memory space in the non-volatile memory 150 that is no longer utilized by the host 110), the FRB 400 may reduce (e.g., significantly reduce) the processing load that is placed on the controller processor 430, which may lead to increased (e.g., improved) system performance. In some embodiments, the controller processor 430 may initiate the garbage collection process, and the garbage collection engine 606 of the FRB 400 may manage and perform the garbage collection process in a manner that is substantially (e.g., completely) transparent to the controller processor 430. A more detailed discussion of the garbage collection process performed by the garbage collection engine 606 may be found in the related U.S. Pat. No. 9,454,551, issued on Sep. 27, 2016.

Figure 6:
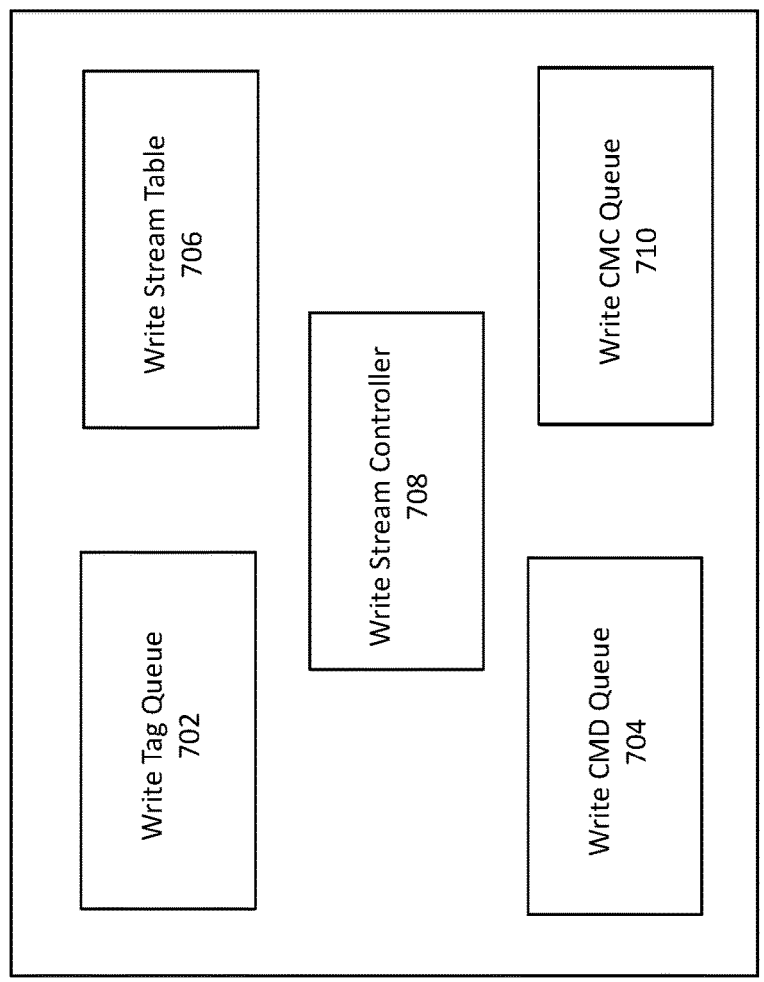
FIG. 6 is a block diagram of a write stream engine of the FRB, according to some embodiments of the present invention.

FIG. 6 is a block diagram of a write stream engine 602 of the FRB 400, according to some embodiments of the present invention.

According to some embodiments, the write stream engine 602 includes a write tag queue 702, a write command queue 704, a write stream table 706, a write stream controller 708, and a write command completion queue 710.

The write tag queue 702 stores incoming write tags to the FRB 400, which are pushed or issued by the controller processor 430. The write tags are logical representations of pages (flash pages) of a block stripe. According to some embodiments, when the controller 130 receives a multi-stream write command from the host 110, the controller processor identifies the stream ID and length of the host data and determines the number of write tags it needs to issue (e.g., generate). In the example shown in FIG. 2, in which each block stripe has four blocks, and thus four page0s, the controller processor may determine, based on the stream ID, that block stripe 0, for example, should be accessed (e.g., opened), and may determine based on the length of host data that, for example, four pages (of, e.g., page stripe PS0) of the non-volatile memory 150 will be used for storing the host data. Thus, the controller processor 430 may issue four write tags from the pool of available write tags to correspond to each of the four pages (e.g., four page0s). The write tags may not be sequential, and may, for example, be WrTag7, WrTag2, WrTag9, and WrTag4, respectively corresponding to page0s of die1, die2, die3, and die4. The FRB 400 may push (i.e., store) the write tags in the write tag queue 702. The controller processor 430 tracks the mapping of write tags to physical locations in the non-volatile memory 150 (e.g., by maintaining an association table or write tag table in the volatile memory 140). According to some embodiments, the write tag queue 702 is a group of queues, each associated with a different stream ID (e.g., the number of queues may be the same as the number of unique stream IDs). The controller processor 430 populates the write tags in their respective queue based on the stream ID. The Stream ID may also be used as an address to the write stream table 706. According to some example, when the write tag table does not contain any information about the stream ID (i.e., if the stream ID is a new, previously un-accessed ID), the controller processor 430 obtains the write tag information from the write tag queue 702 based on the stream ID. In some embodiments, the write tag does not itself contain any information about the corresponding stream ID; however, embodiments of the present invention are not limited thereto, and the write tags may themselves contain a field for indicating the stream ID.

The write command queue 704 stores incoming write commands from the controller processor 430. The write command may, for example, indicate how many LBNs the FRB 400 should expect to receive for the write command. In some embodiments, the write command queue 704 includes a field to indicate whether an incoming write command is a multi-stream operation, and a field to indicate the stream ID, which is the same ID used in the write tag.

The write stream table 706 stores the information about the different streams, so that the write stream engine 602 can switch from one stream to another without losing the stream position of the previous operation. In some embodiments, a different block stripe of the non-volatile memory 150 may be allocated to each of the stream types (or stream IDs). Generally, there is no guarantee in what stream sequence the host data will arrive, and the host 110 may write, for example, a first data of stream ID1, a second data of stream ID5, a third data of stream ID2, a fourth data of stream ID1 again, etc. As such, the FRB 400 may not always write to fresh block stripes and may regularly have to write data to block stripes to which it has already written host data. In so doing, every time the FRB 400 writes to a block stripe of the non-volatile memory 150, it stores the position of the next available position within the block stripe to the write stream table 706, for later use. As such, the write stream table 706 points to the current physical position within the associated block stripe of each stream ID.

The write stream controller 708 is responsible for retrieving (e.g., fetching) write commands from the write command queue 704, checking the stream ID associated with the retrieved command, and retrieving the information from the write stream table 706 and processing the command. The write stream controller 708 also manages the write stream table 706 by updating an entry in the write stream table 706 every time a new stream ID that is different from the current stream ID (i.e., the active stream ID) is to be accessed. Thus, the write stream controller 708 is responsible for saving and restoring stream context (i.e., stream status information). The stream context or status indicates where the stream was last left off and points to the starting point of any future writes to an already accessed stream (or block stripe).

The write command completion queue 710 stores a list of recently completed (e.g., serviced) write commands. Every time the write stream engine 602 writes (e.g., flushes) the data associated with a write command to the non-volatile memory 150, the completed command is queued in the write command completion queue 710. The write stream engine 602 then proceeds to notify the controller processor 430 of the command completions in the order in which they were queued in the write command completion queue 710. In some embodiments, the write command completion queue 710 has a field to indicate the Stream ID of each completed command.

The operation of the write stream controller 708 with respect to the write tag queue 702, the write command queue 704, the write stream table 706, and a write command completion queue 710 will be further described with reference to FIG. 7.

Figure 7:
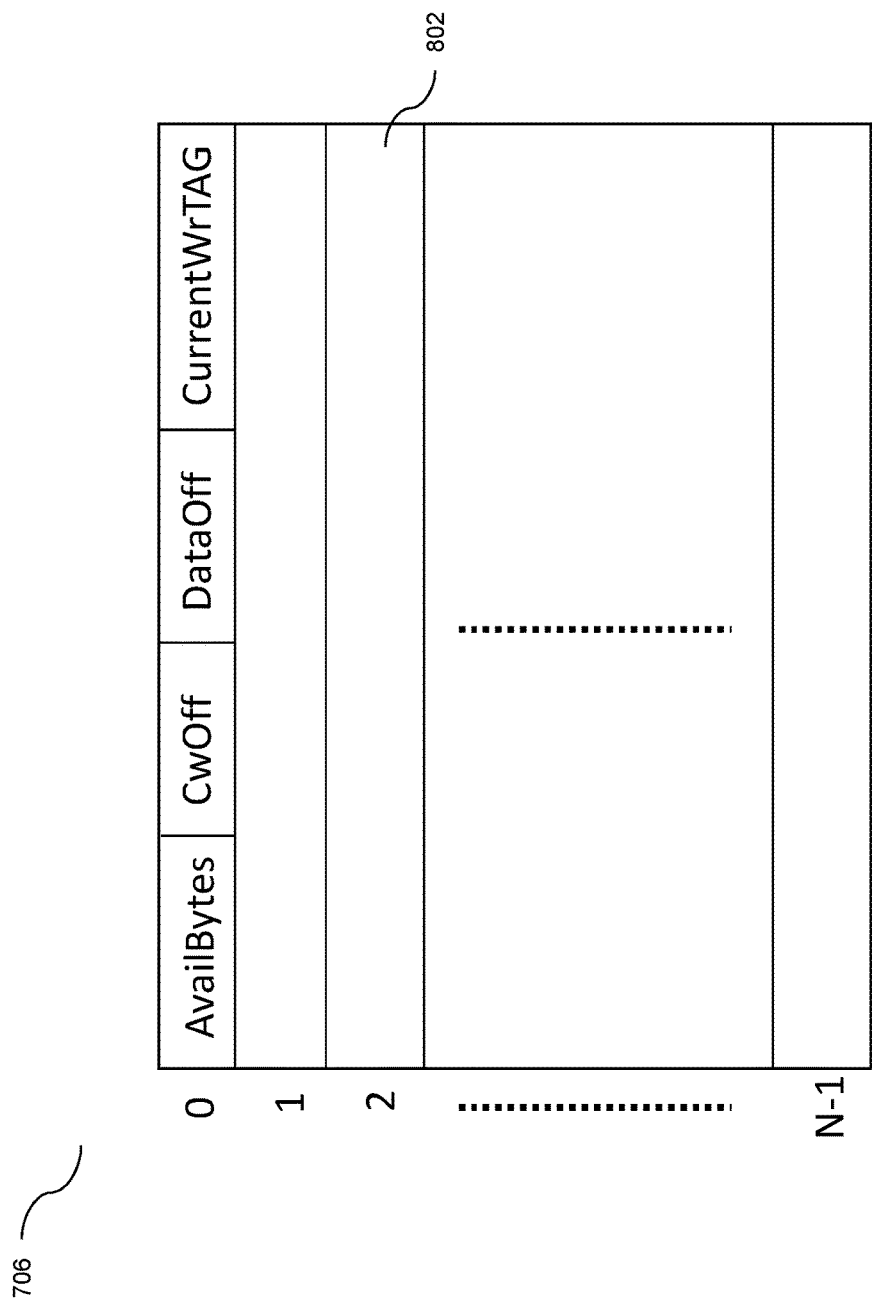
FIG. 7 illustrates a write stream table according to some embodiments of the present invention.

FIG. 7 illustrates the write stream table 706 according to some embodiments of the present invention.

In some embodiments, the write stream table 706 maintains a record of the status of each stream of the multi-stream. The write stream table 706 may include a plurality of entries 802, which represent respective ones of the different stream of the multi-stream. For example, in a multi-stream access system having N different stream types (N being an integer greater than 1), the write stream table 706 may include N entries 802 identified by table indices 0 to N−1. Each entry 802 may contain information related to the status of each of the different stream types (or stream IDs). In some examples, the status information may include available bytes (AvailBytes) indicating the remaining number of bytes available in the associated memory page; the codeword offset (CwOff; i.e., the codeword number within the memory page), of the next LBN; the data offset (DataOff; i.e., the position, in bytes, within the codeword) of the next LBN; and the current write tag (CurrentWrTag) indicating which page of the page stripe to use for the next LBN. The codeword offset and the data offset together indicate the start point of the next LBN in the stream (as identified by the table index or stream ID) within a page of the associated block stripe of the non-volatile memory 150.

According to some embodiments, the write stream controller 708 saves a new entry 802 in the write stream table 706 every time a new stream ID (e.g., a new block stripe), which is different from the current or active stream ID (block stripe), is accessed by the controller 130. At a later time, when the same stream ID (e.g., the same block stripe) is accessed again, the write stream controller 708 retrieves the status information for that stream ID (essentially where the FRB 400 had previously left off) from the write stream table 706 using the associated stream ID, which may be the same as the table index of the write stream table 706. The end point of a previous stream ID (e.g., block stripe) access marks the starting point of the access to the same stream ID (e.g., block stripe).

In some embodiments, when the write stream engine 602 completes a write command, the write stream controller 708 retrieves a new command (e.g., the command subsequent to the completed command) from the write command queue 704, and inspects the command to determine the new stream ID of the new write command. When the new stream ID matches a previously accessed stream ID, the write stream controller 708 retrieves the status of the new stream ID, and compares the size of the incoming data (as provided by the controller processor 430) with the available bytes in the associated block stripe, the codeword offset, and the data offset to determine if a new page in the block stripe should be opened and/or if there is sufficient remaining memory capacity in the block stripe to store the incoming data. In some embodiments, when the FRB 400 determines that there is insufficient capacity in the associated block stripe to accommodate the host data, the FRB 400 opens a new block stripe, which has the desired characteristics associated with the stream ID (e.g., has the requisite endurance/lifetime), and writes all or at least a portion of the incoming host data to the new block stripe. The write stream controller 708 then proceeds to update the entry 802 in the write stream table 706 for the stream ID to reflect the new end point of the data in the new block stream.

Figure 8:
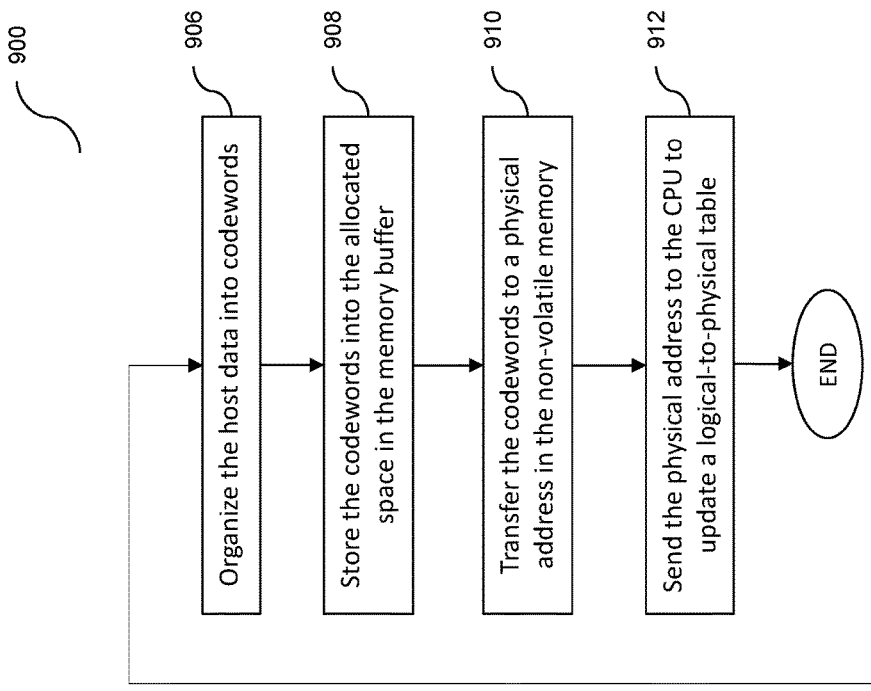
FIG. 8 is a flow diagram of a process for writing multi-stream host data to a SSD, according to some illustrative embodiments of the present invention.
Figure 8:
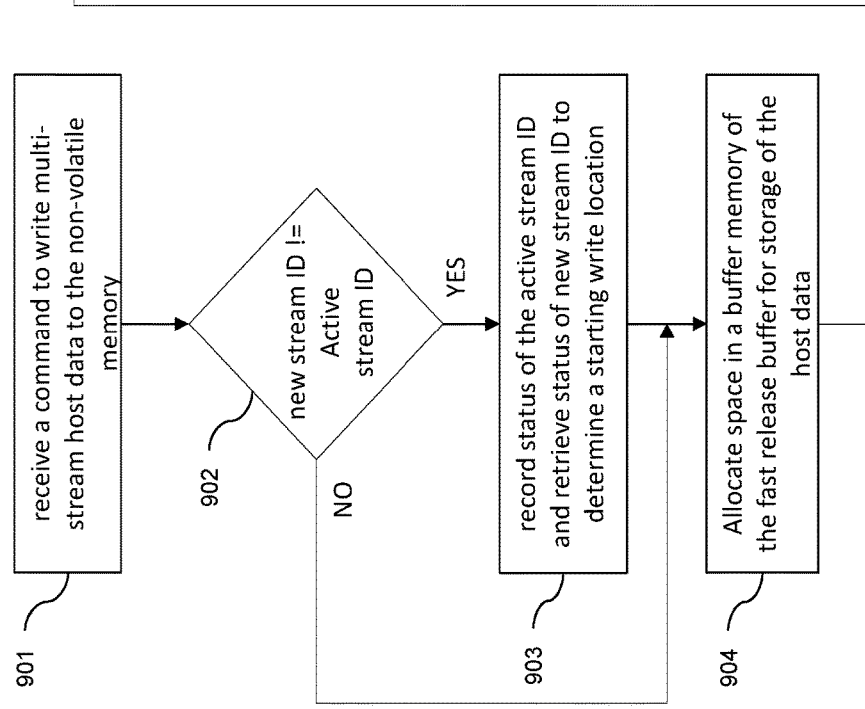

FIG. 8 is a flow diagram of a process 900 for writing host data to a SSD 120, according to some illustrative embodiments of the present invention.

At act 901, the FRB 400 receives, from the CPU 430, a command to write the multi-stream host data to the non-volatile memory 150. The multi-stream host data is associated with a logical block number (LBN) of the controller 130 and a new stream ID. The command may include one or more of a size of each codeword (CW) of the one or more CWs, a code rate of the CWs (e.g., a size ratio of the payload section to the CW), and the number of pages in a page stripe 170 of the non-volatile memory 150.

At act 902, the FRB 400 determines whether or not the new stream ID matches (e.g., is equal to) an active (e.g., current) stream ID of a preceding write command. If there is a match, the FRB 400 skips act 903 and proceeds to act 904. If the new stream ID does not match the active stream ID, the FRB 400 proceeds to act 903.

At act 903, the FRB records, in the write stream table 706, the status of the active stream ID and retrieves, from the write stream table 706, status information of the new stream ID to determine a physical address in the non-volatile memory 150 for storing one or more codewords (CWs) corresponding to the multi-stream host data. In some embodiments, the FRB 400 records the status of the active stream ID by recording, in the write stream table 706, the number of available bytes in the last used page of a block stripe of the non-volatile memory 150 associated with the active stream ID, a last used memory page of the block stripe (as e.g., represented by the corresponding write tag), and a code word offset and a data offset indicating an end position within a last utilized page of the block stripe associated with the active stream ID. In some embodiments, the FRB 400 retrieves the status information of the new stream ID by retrieving, from the write stream table 706, the number of available bytes of a block stripe of the non-volatile memory 150 associated with the new stream ID, a last used memory page of the block stripe, and a code word offset and a data offset indicating an end position within a last utilized page of the block stripe associated with the new stream ID. The FRB 400 then determines said physical address in the block stripe based on the available bytes, the last used memory page, and the code word and data offsets.

At act 904, the FRB 400 allocates space in a buffer memory 610 of the FRB 400 for storage of the host data. In some embodiments, the FRB 400 determines a count N of CW spaces sufficient to store the host data in the buffer memory 610. The FRB 400 then retrieves N CW indexes from the CW pool 612 on a first-in, first-out (FIFO) basis and removes the N CW indexes from the CW pool 612. The FRB 400 may also associate the N CW indexes with the host data.

At act 906, the FRB 400 organizes the host data into one or more codewords (CWs). In some embodiments, the FRB 400 divides the host data into one or more payload sections and encodes the one or more payload sections to generate the one or more CWs. The FRB 400 may instruct the ECC engine 420 to encode the one or more payload sections and to generate one or more parity sections (e.g., error correction codes or coded sections), which may include one or more parity bits. The FRB 400 may receive the one or more parity sections from the ECC engine 420, each parity section of the one or more parity sections corresponding to a payload section of the one or more payload sections. The FRB 400 may then combine each of the one or more payload sections with the corresponding one of the one or more parity sections to generate the one or more CWs.

According to some embodiments, the FRB 400 varies (e.g., adjusts) a size of each of the one or more payload sections and instructs the ECC engine 420 to vary a size of each of the corresponding one or more parity sections based on one or more parameters including a state of the non-volatile memory 150 at the physical address and a requisite protection level determined by a type (e.g., kind) of host data to be stored in the non-volatile memory 150.

At act 908, the FRB 400 stores the one or more CWs into the allocated space in the buffer memory. In so doing, the FRB 400 copies (e.g., writes) the host data into the N CW spaces of the buffer memory 610 that are associated with the retrieved CW indexes.

At act 910, the FRB 400 transfers the one or more CWs from the buffer memory to the physical address in the non-volatile memory 150 (which was, e.g., determined in act 903). In an example, the transfer occurs when a number of the CWs stored in the buffer memory exceeds a value corresponding to the size of a flash memory page. In some embodiments, the channel controller 460 may request the one or more CWs from the buffer memory 610 of the FRB 400 and write the one or more CWs to the physical address in the non-volatile memory 150. After the transfer is complete, the FRB 400 may de-allocate the allocated space in the buffer memory 610 by returning (e.g., adding) the removed N CW indexes to the CW pool 612.

In some embodiments, after transferring the one or more CWs from the buffer memory to the physical address in the non-volatile memory 150, the FRB 400 records the status of the new stream ID in the write stream table 706.

At act 912, the FRB 400 sends the LBN and the physical address to the CPU 430 to update a logical-to-physical table in the volatile memory of the storage device.

Other embodiments are within the scope and spirit of the present invention. For example, the functionality described above can be implemented using software, hardware, firmware, hardwiring, or combinations thereof. One or more computer processors operating in accordance with instructions may implement the FRB 400 related functions in accordance with the present invention as described above. It is within the scope of the present invention that such instructions may be stored on one or more non-transitory processor readable storage media (e.g., a magnetic disk, non-volatile random-access memory, phase-change memory or other storage medium). Additionally, modules implementing functions may also be physically located at various positions, including being distributed such that portions of functions are implemented at different physical locations.

In some embodiments, the functions performed by one or more (e.g., all) of the constituent elements of the FRB 400 may be performed by a processor and a memory having stored thereon instructions that cause the processor to perform the above-described functions.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the present invention. Further, although the present invention has been described herein in the context of a particular implementation in a particular environment for a particular purpose, those of ordinary skill in the art will recognize that its usefulness is not limited thereto and that the present invention may be beneficially implemented in any number of environments for any number of purposes. Accordingly, the claims set forth below should be construed in view of the full breadth and spirit of the present invention as described herein and equivalents thereof.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on," "connected to," "coupled to," or "adjacent" another element or layer, it can be directly on, connected to, coupled to, or adjacent the other element or layer, or one or more intervening elements or layers may be present. When an element or layer is referred to as being "directly on," "directly connected to," "directly coupled to," or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The SSD and/or any other relevant devices or components according to embodiments of the present invention described herein may be implemented utilizing any suitable hardware, firmware (e.g., an application-specific integrated circuit), software, or a suitable combination of software, firmware, and hardware. For example, the various components of the SSD may be formed on one integrated circuit (IC) chip or on separate IC chips. Further, the various components of the SSD may be implemented on a flexible printed circuit film, a tape carrier package (TCP), a printed circuit board (PCB), or formed on a same substrate. Further, the various components of the SSD may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

What is claimed is:

1. A method of writing multi-stream host data to a storage device comprising a central processing unit (CPU), a self-organized, multi-stream fast release buffer (FRB), and a non-volatile memory, the storage device being in communication with a host, the method comprising:
    receiving, by the FRB, a command to write the multi-stream host data to the non-volatile memory from the CPU, the multi-stream host data being associated with a logical block number (LBN) and a new stream ID;
    determining, by the FRB, that the new stream ID does not match an active stream ID of a preceding write command;
    in response to the determining that the new stream ID does not match the active stream ID, recording, by the FRB, a status of the active stream ID and retrieving, by the FRB, a status of the new stream ID to determine a physical address in the non-volatile memory for storing one or more codewords (CWs) corresponding to the multi-stream host data;
    allocating space, by the FRB, in a buffer memory of the FRB for storage of the multi-stream host data;
    organizing, by the FRB, the multi-stream host data into the one or more CWs;
    storing, by the FRB, the one or more CWs into the allocated space in the buffer memory;
    transferring, by the FRB, the one or more CWs from the buffer memory to the physical address in the non-volatile memory; and
    sending, by the FRB, the LBN and the physical address to the CPU to update a logical-to-physical table.

2. The method of claim 1, wherein the recording of the status of the active stream ID comprises:
    recording, by the FRB, a last used memory page of a block stripe of the non-volatile memory associated with the active stream ID, a number of available bytes of the last used memory page, and a code word offset and a data offset indicating an end position within the last utilized page of the block stripe associated with the active stream ID.

3. The method of claim 1, wherein the retrieving of the status information of the new stream ID comprises:
    retrieving, by the FRB, a last used memory page of a block stripe of the non-volatile memory associated with the active stream ID, a number of available bytes of the last used memory page, and a code word offset and a data offset indicating an end position within a last utilized page of the block stripe associated with the new stream ID; and
    determining, by the FRB, the physical address in the block stripe based on the available bytes, the last used memory page of the block stripe, and the code word and data offsets.

4. The method of claim 1, further comprising recording status of the new stream ID after transferring the one or more CWs from the buffer memory to the physical address.

5. The method of claim 1, wherein each of the new and active stream IDs is one of a plurality of stream IDs recognized by the storage device, each of the plurality of stream IDs being associated with a block stripe of the non-volatile memory meeting characteristic requirements of the associated stream ID.

6. The method of claim 5, wherein at least one stream ID of the plurality of stream IDs is associated with two or more block stripes having the same characteristic.

7. The method of claim 5, wherein at least two stream IDs of the plurality of stream IDs are associated with a same block stripe of the non-volatile memory.

8. The method of claim 1,
    wherein the buffer memory comprises a plurality of codeword (CW) spaces, each CW space of the plurality of CW spaces being associated with a CW index of a plurality of CW indexes, the CW indexes being stored in a CW pool of the FRB, and
    wherein the allocating of the space in the buffer memory comprises:
        determining, by the FRB, a count N of CW spaces sufficient to store the multi-stream host data in the buffer memory, N being an integer greater than 1;
        retrieving, by the FRB, N CW indexes from the CW pool on a first-in, first-out basis;
        removing, by the FRB, the N CW indexes from the CW pool; and
        associating, by the FRB, the N CW indexes with the multi-stream host data.

9. The method of claim 8, wherein the storing of the one or more CWs comprises storing, by the FRB, the multi-stream host data in N CW spaces of the buffer memory that are associated with the retrieved CW indexes, and
    wherein the method further comprises de-allocating, by the FRB, the allocated space in the buffer memory by adding the removed N CW indexes to the CW pool.

10. The method of claim 1, wherein the organizing of the multi-stream host data into one or more CWs comprises:
dividing, by the FRB, the multi-stream host data into one or more payload sections; and
encoding, by the FRB, the one or more payload sections to generate the one or more CWs.

11. The method of claim 10, wherein the encoding of the one or more payload sections comprises:
instructing, by the FRB, an error correction code (ECC) engine to encode the one or more payload sections and to generate one or more parity sections;
receiving, by the FRB, the one or more parity sections from the ECC engine, each parity section of the one or more parity sections corresponding to a payload section of the one or more payload sections; and
combining, by the FRB, each payload section of the one or more payload sections with a corresponding one of the one or more parity sections to generate the one or more CWs.

12. The method of claim 1, wherein the transferring of the one or more CWs comprises:
determining, by the FRB, if a size of the CWs stored in the buffer memory is greater or equal to a size of a flash memory page; and
in response to the determination, transferring, by the FRB, the one or more CWs from the buffer memory to a channel controller for storage in a physical address in the non-volatile memory.

13. The method of claim 1, wherein the transferring of the one or more CWs comprises:
receiving, by the FRB, a command to transfer the one or more CWs from the buffer memory to a channel controller for storage in a physical address in the non-volatile memory; and
transferring, by the FRB, the one or more CWs from the buffer memory to the channel controller,
wherein the command to transfer the one or more CWs is received when a size of the CWs stored in the buffer memory is greater or equal to a size of a flash memory page.

14. A storage device configured to receive and store multi-stream host data in response to a multi-stream host write request, the storage device comprising a central processing unit (CPU), a self-organized, multi-stream fast release buffer (FRB), and a non-volatile memory, the FRB comprising:
a processor; and
a memory having stored thereon instructions that, when executed by the processor, cause the processor to perform:
receiving a command to write the multi-stream host data to the non-volatile memory from the CPU, the multi-stream host data being associated with a logical block number (LBN) and a new stream ID;
determining that the new stream ID does not match an active stream ID of a preceding write command;
in response to the determining that the new stream ID does not match the active stream ID, recording a status of the active stream ID and retrieving a status of the new stream ID to determine a physical address in the non-volatile memory for storing one or more codewords (CWs) corresponding to the multi-stream host data;
allocating space in a buffer memory of the FRB for storage of the multi-stream host data;
organizing the multi-stream host data into the one or more CWs;
storing the one or more CWs into the allocated space in the buffer memory;
transferring the one or more CWs from the buffer memory to the physical address in the non-volatile memory; and
sending the LBN and the physical address to the CPU to update a logical-to-physical table.

15. The storage device of claim 14, wherein the recording of the status of the active stream ID comprises:
recording a last used memory page of a block stripe of the non-volatile memory associated with the active stream ID, a number of available bytes of the last used memory page, and a code word offset and a data offset indicating an end position within the last utilized page of the block stripe associated with the active stream ID.

16. The storage device of claim 14, wherein the retrieving of the status information of the new stream ID comprises:
retrieving a last used memory page of the block stripe of the non-volatile memory associated with the active stream ID, a number of available bytes of the last used memory page, and a code word offset and a data offset indicating an end position within a last utilized page of the block stripe associated with the new stream ID; and
determining the physical address in the block stripe based on the available bytes, the last used memory page of the block stripe, and the code word and data offsets.

17. The storage device of claim 14, further comprising recording status of the new stream ID after transferring the one or more CWs from the buffer memory to the physical address.

18. The storage device of claim 14, wherein each of the new and active stream IDs is one of a plurality of stream IDs recognized by the storage device, each of the plurality of stream IDs being associated with a block stripe of the non-volatile memory meeting characteristic requirements of the associated stream ID.

19. The storage device of claim 18, wherein the transferring of the one or more CWs comprises:
determining if a size of the CWs stored in the buffer memory is greater or equal to a size of a flash memory page; and
in response to the determination, transferring the one or more CWs from the buffer memory to a channel controller for storage in a physical address in the non-volatile memory.

20. The storage device of claim 14,
wherein the buffer memory comprises a plurality of codeword (CW) spaces, each CW space of the plurality of CW spaces being associated with a CW index of a plurality of CW indexes, the CW indexes being stored in a CW pool of the FRB, and
wherein the allocating of the space in the buffer memory comprises:
determining a count N of CW spaces sufficient to store the host data in the buffer memory, N being an integer greater than 1;
retrieving N CW indexes from the CW pool on a first-in, first-out basis;
removing the N CW indexes from the CW pool; and
associating the N CW indexes with the host data.

21. The storage device of claim 14, wherein the organizing of the host data into one or more CWs comprises:
dividing the host data into one or more payload sections; and
encoding the one or more payload sections to generate the one or more CWs.

22. A storage device configured to receive and store multi-stream host data in response to a multi-stream host write command, the storage device comprising:
- a host controller coupled to the host and configured to receive the multi-stream host write command and multi-stream host data from the host, and to transfer the multi-stream host data to a self-organized, multi-stream fast release buffer (FRB);
- a channel controller coupled to a non-volatile memory of the storage device and configured to receive one or more codewords (CWs) from the FRB and to store the one or more CWs in the non-volatile memory;
- a central processing unit (CPU) coupled the host controller and the FRB, and configured to send to the FRB a command to write multi-stream host data to the non-volatile memory in response to the multi-stream host write command received by the host controller, and to update a logical-to-physical table;
- an error correction code (ECC) engine coupled to the FRB and configured to generate one or more parity sections corresponding to the one or more CWs; and
- the FRB comprising:
  - a processor; and
  - a memory having stored thereon instructions that, when executed by the processor, cause the processor to perform:
    - receiving a command to write the multi-stream host data to the non-volatile memory from the CPU, the multi-stream host data being associated with a logical block number (LBN) and a new stream ID;
    - determining that the new stream ID does not match an active stream ID of a preceding write command;
    - in response to the determining that the new stream ID does not match the active stream ID, recording a status of the active stream ID and retrieving a status of the new stream ID to determine a physical address in the non-volatile memory for storing one or more codewords (CWs) corresponding to the multi-stream host data;
    - allocating space in a buffer memory of the FRB for storage of the multi-stream host data;
    - organizing the multi-stream host data into the one or more CWs;
    - storing the one or more CWs into the allocated space in the buffer memory;
    - transferring the one or more CWs from the buffer memory to the physical address in the non-volatile memory; and
    - sending the LBN and the physical address to the CPU to update a logical-to-physical table.

* * * * *